UNITED STATES PATENT OFFICE.

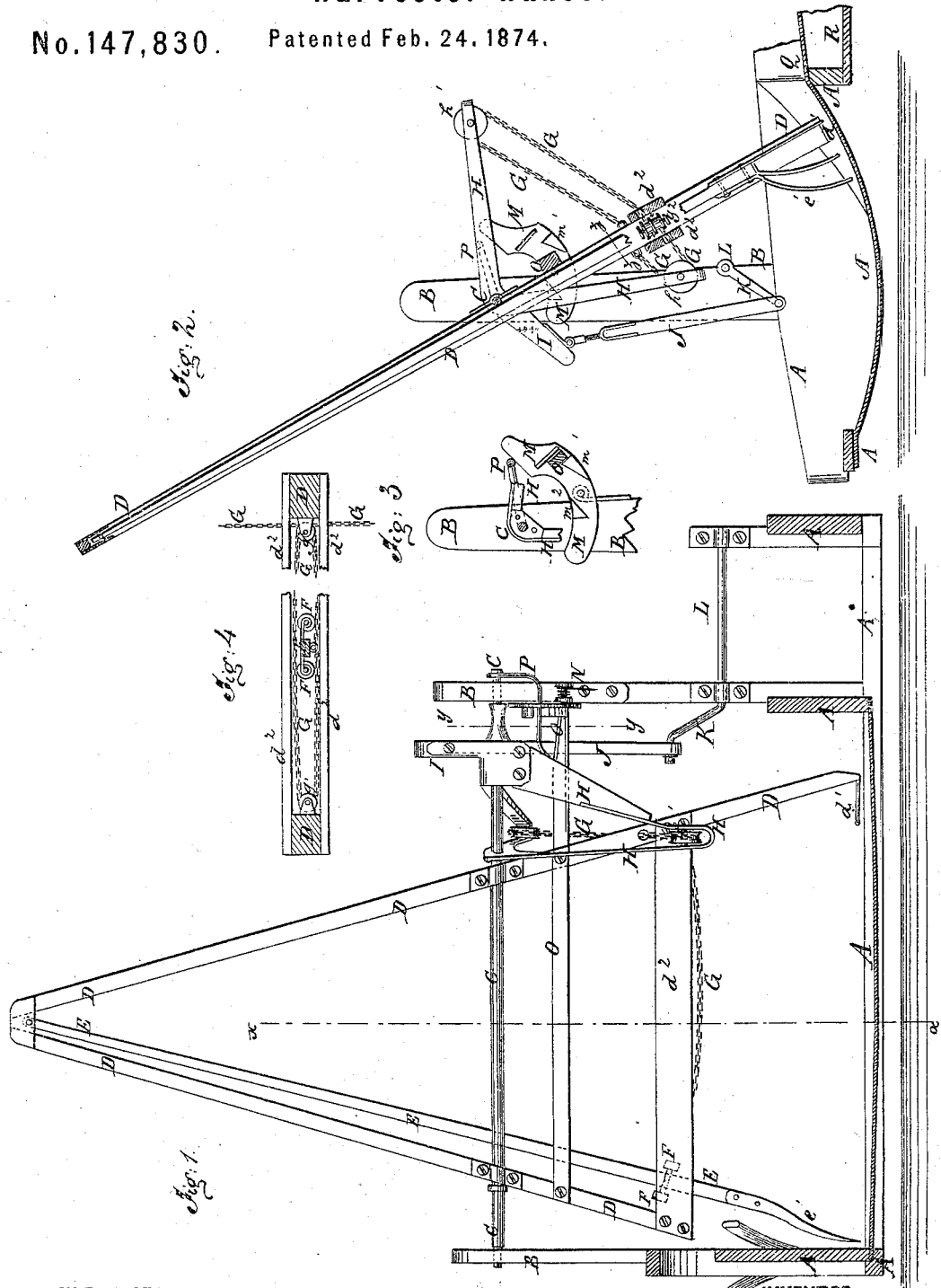

JOHN J. DEWEY, OF RED WING, MINNESOTA.

IMPROVEMENT IN HARVESTER-RAKES.

Specification forming part of Letters Patent No. 147,830, dated February 24, 1874; application filed January 17, 1874.

*To all whom it may concern:*

Be it known that I, JOHN J. DEWEY, of Red Wing, in the county of Goodhue and State of Minnesota, have invented a new and useful Improvement in Automatic Rake for Harvesters, of which the following is a specification:

Figure 1 is a rear view of my improved device, the platform being shown in section. Fig. 2 is a cross-section of the same, taken through the line $x\,x$, Fig. 1. Fig. 3 is a detail section, taken through the line $y\,y$, Fig. 1, showing the lock-catch and its trip. Fig. 4 is a detail section, taken through the line $z\,z$, Fig. 2, showing the arrangement of the chain.

Similar letters of reference indicate corresponding parts.

My invention has for its object to furnish an improved attachment for harvesters for collecting the cut grain and delivering it in compact gavels either to binders or upon the ground, and which shall be simple in construction and reliable in use. The invention consists in the combination of the suspension-rod, the swinging frame, the pivoted bar, the chain, and its guide-pulleys, the rocker and its pulleys, the arms, the connecting-rod, and the crank, with each other, and with the platform and drive-wheel shaft of a harvester, and in the catch-plate, its spring, the catch-bar, and the trip-rod, in combination with the rocker and the swinging frame, as hereinafter fully described.

A represents the platform of a reaper, to the end parts of which are attached two uprights, B, the upper ends of which are connected by a rod, C. To the rod C is hung a V-shaped frame, D, the inner-side bar of which is extended downward, so as to nearly touch the platform A, and to the lower end of which is attached one or more fingers, $d^1$, to assist in moving the gavel. E is a bar, the upper end of which is pivoted in the angle of the frame D, so that its lower end may sweep longitudinally across the platform A. The frame D and bar E are made of such a length that the arc of the circle, through which the lower end of the said bar E sweeps, may differ but little from a straight line. To the lower end of the bar E are attached fingers $e'$, by which the grain is collected and swept across the platform, and against the downwardly-projecting end of the side bar of the frame D. The bar E is kept in line with the frame D by two cross-bars, $d^2$, attached to the lower part of the side bars of said frame, and between which the said bar E vibrates, the friction being reduced by friction-wheels F attached to said bar E, and which roll along the inner surface of the said bars $d^2$. G is a chain attached to the bar E. One part of the chain G passes around a pulley, $g'$, pivoted to the outer-side bar of the frame D between the outer ends of the cross-bars $d^2$. Both parts of the chain G pass around guide-pulleys $g^2$ pivoted to the inner-side bar of the frame D, between the inner ends of the cross-bars $d^2$, and thence out through the ends of the opposite cross-bars $d^2$. The parts of the chain G pass around pulleys $h'$, pivoted to the ends of the arms of the rocker H, and their ends are attached to the opposite sides of the inner-side bar of the frame D, as shown in Fig. 2, so that the bar E may be vibrated by the oscillation of the rocker H. The rocker H works upon the rod C, and to it is attached an arm, I, to the outer end of which is pivoted the upper end of a connecting-rod, J, the other end of which is pivoted to a crank, K, formed upon or attached to the drive-wheel shaft L, so that the rocker H may be operated by the advance of the machine. M is a catch-plate, which is pivoted to the upper part of the inner upright B, and is held in position by a spring connected with it. Upon the inner side of the catch-plate M are formed inclined projections $m^1\,m^2$ to receive the end of a bar, O, attached to the frame D, to hold said frame stationary at certain times. The catch-plate M is tripped to release the bar O, and allow the frame D to swing by a trip-rod, P, attached to the rocker H, and which strikes against the inclined upper end of the plate M, and releases the frame D at each movement of the rocker H. With this construction, when the parts of the device are in the position shown in Fig. 2, and the machine is drawn forward, the first effect is for the end of the bar O to pass and be caught by the projection $m^1$, as shown in Fig. 3. As the machine continues to advance, the movement of the rocker H and chain G moves the bar E along the rear edge of the platform. As the bar E reaches the outer end of the platform A, the trip-rod P strikes the catch-plate M, and releases the bar O, and the rocker H, in its forward movement, carries the frame D and bar E with it to the forward edge of the platform A, the lower end of the bar E passing along the outer end of said platform. As the frame D and bar E reach the end of their forward movement, the end of the bar O is caught by the projection $m^2$ of the catch-plate M. As the rocker H begins its return movement, the chain G causes the bar E to sweep longitudinally along the forward part of the platform A, collecting the grain into a compact gavel against the downwardly-projecting end of the inner-side bar of the frame D. As the bar E reaches the inner end of its stroke, the trip-rod P strikes the catch-plate M, and releases the bar O and the frame D, and bar E moves to the rearward across the inner end of the platform A, carrying the gavel with it to the rear edge of the platform. As the bar E again begins its outward movement, the gavel is left upon a spout, Q, attached to the rear edge of the inner part of the platform, whence it is taken by the binders and bound. The binders sit upon adjustable seats attached to the binders' platform R, which is secured to the rear part of the platform-frame. By detaching the spout Q and binders' platform R, the gavel may be allowed to drop upon the ground.

Having thus described my invention, I claim as new and desire to secure by Letters Patent—

1. The combination of the rod C, swinging frame D, pivoted bar E, chain G, and its guide-pulleys $g^1$ $g^2$, the rocker H, and its pulleys $h'$, arm I, connecting-rod J, and crank K, with each other and with the platform and drive-wheel shaft of a harvester, substantially as herein shown and described.

2. The catch-plate M $m^1$ $m^2$, spring N, bar O, and trip-rod P, in combination with the rocker H and swinging frame D, substantially as herein shown and described, and for the purpose set forth.

JOHN J. DEWEY.

Witnesses:
JOSEPH BATTO,
JOHN HACK.